United States Patent Office 3,467,634
Patented Sept. 16, 1969

3,467,634
ORGANOSILICON TERPOLYMERS
Burton B. Jacknow and Joseph H. Moriconi, Rochester, N.Y., assignors to Xerox Corporation, Rochester, N.Y., a corporation of New York
No Drawing. Filed Aug. 10, 1966, Ser. No. 571,388
Int. Cl. C08f 19/10, 15/40
U.S. Cl. 260—80.71                              9 Claims

ABSTRACT OF THE DISCLOSURE

A substantially linear addition terpolymer of a styrene composition, an acrylate or methacrylate ester and a polymerizable organo silicon composition selected from the group consisting of silanes, silanols and siloxanes having from 1 to 3 hydrolyzable groups and an organic group attached directly to a silicon atom containing an unsaturated carbon to carbon linkage.

---

This invention relates to a method of preparing organosilicon polymers and to the products so prepared. It is particularly directed to new organosilicon terpolymers having stable triboelectric properties.

It is known that many polymeric materials may be employed as coatings for various substrates. Each type of polymeric material possess physical and chemical properties peculiar to that particular material. Thus, different polymeric materials are identifiable by their characteristic properties such as dielectric strength, water absorption, thermostability, gloss, solubility, triboelectric stability, adhesion, tensile strength, compressive strength and many others. While many known polymeric materials possess utility in the coating art, individual types of polymeric materials generally have different specific characteristics which may render them desirable for some applications and undesirable for others. In some specific applications, no known polymeric material may possess all the characteristics necessary for optimum results. This is particularly true in applications such as coatings for xerographic carriers.

Xerographic carriers are employed in cascade development processes such as the process described by L. E. Walkup in U.S. Patent 2,618,551. This technique requires the employment of carrier coatings having smooth surfaces, high tensile strength, stable triboelectric characteristics, strong adhesion to substrates, impaction resistant surfaces and good solubility in conventional solvents.

It is known that some organosilicon monomers can be chemically incorporated into various organic resins in order to improve various properties of the latter such as dielectric strength, water absorption, thermostability, gloss and others. One of the difficulties which has been encountered is that of incompatibility between the organosilicon monomers and organic resin monomers. The incompatibility often prevents incorporation of pure organosilicon compounds in the organic resin. In some cases, the incorporation may be carried out by means of a mutual solvent, but this often necessitates the subsequent removal of the solvent from the finished product. Such removal is expensive and sometimes hazardous if the solvent is toxic or inflammable. Further, some copolymer systems do not form alternating copolymers but instead form two homopolymers. Many organosilicon compounds impart abhesive characteristics to a resin rather than adhesive properties. Since the number of organosilicon compounds which can be formulated approaches the number of known carbon compounds, selection of a compatible organosilicon-resin combination which overcomes the foregoing deficiencies presents an almost insurmountable task. Thus, there is a continuing need for a better polymeric organosilicon coating material.

It is, therefore, an object of this invention to provide polymeric organosilicon compounds which overcome the above noted deficiencies.

It is another object of this invention to provide a polymeric organosilicon compound which forms coatings having high gloss surfaces.

It is a further object of this invention to provide a polymeric organosilicon compound which tenaciously adheres to most surfaces.

It is a still further object of this invention to provide a polymeric organosilicon compound which forms coatings highly resistant to chipping and flaking.

It is yet another object of this invention to provide a polymeric organosilicon compound having stable triboelectric characteristics.

It is a further object of this invention to provide a polymeric organosilicon compound having high tensile and compressive strength.

It is still another object of this invention to provide a polymeric organosilicon compound which forms coatings having highly abhesive outer surfaces.

It is another object of this invention to provide a method of preparing polymeric organosilicon compounds with or without the presence of a solvent.

The foregoing objects and others are accomplished in accordance with this invention, generally speaking, by providing novel terpolymer compositions which are the products of an addition polymerization reaction between monomers or prepolymers of (1) a styrene compound, (2) an acrylate or methacrylate ester and (3) an organosilicon compound having from 1 to 3 hydrolyzable groups and an organic group attached directly to the silicon atom containing an unsaturated carbon to carbon linkage capable of addition polymerization. A terpolymer containing from about 5 to about 94.5 percent, by weight, of a styrene compound; from about 94.5 to about 5 percent, by weight, of an acrylate or methacrylate ester; and from about 50 to about 0.5 percent, by weight, of the polymerizable unsaturated organosilicon compound is preferred because the composition possesses optimum coating characteristics. However, satisfactory polymers are obtained with terpolymers containing from about 0.5 to about 99 percent, by weight, of a styrene compound; from about 99 to about 0.5 percent, by weight, of an acrylate or methacrylate ester; and from about 50 to about 0.5 percent, by weight, of the polymerizable unsaturated organosilicon compound. The solid polymers of this invention are obtained by heating the mixture of monomers and/or prepolymers in the presence of a catalyst system comprising a free-radical initiator or catalyst capable of polymerizing the monomers or prepolymers. The polymerization reaction may, if desired, be conducted in the presence of a suitable anhydrous solvent.

The unsaturated organic group attached to a silicon atom of the organosilicon compound contains the unsaturation in a non-benzoid group and is preferably an unsaturated hydrocarbon group or derivatives thereof. Typical unsaturated organic groups include: vinyl, chlorvinyl, divinyl, distyryl, allyl, diallyl, triallyl, allyl-phenyl dimethallyl, and methacryloxypropyl groups. Typical hydrolyzable groups include: ethoxy, methoxy, propoxy, chloro, bromo, propyloxy, acetoxy, and amino groups. Examples of typical unsaturated organosilanes having hydrolyzable groups attached to a silicon atom include: vinyl triethoxy silane, vinyl methoxy silane, vinyl-tris (beta-methoxyethoxy) silane; gamma-methacryloxypropyltrimethoxy silane, vinyl trichloro silane, vinyl triacetoxy silane, divinyldichloro silane, and dimethylvinyl chloro silane. Suitable corresponding polymerizable hydrolysis products and the corresponding siloxanes may be substituted for the foregoing unsaturated organo silanes. If more than one organic group is attached to a silicon atom only one of the organic groups need be unsaturated to enter into a polymerization reaction with other unsaturated compounds capable of addition polymerization. Hence, compounds such as dimethylvinylchlorosilane are suitable. When more than one unsaturated group attached to the silicon atom is present, these unsaturated groups need not be identical. For example, vinyl allyl silicon chlorides and bromides may be employed. Partially condensed siloxanes in the liquid stage having reactive unsaturated organic groups attached to a silicon atom may be employed as the organo-silicon component of the polymers of this invention. Organo-silicon compounds free of inhibitors are preferred because higher reaction rates are achieved. Removal of the inhibitors may be accomplished by any suitable well known technique such as by distillation, silica gel sorption and the like.

Suitable silicon free monomers or prepolymers with which the above organosilicon compounds are particularly adapted to react to form the novel polymer to this invention include monomers and prepolymers of the styrene and the acrylate and methacrylate compounds. Any suitable substituted or unsubstituted styrene, acrylate or methacrylate compound may be employed. The substituted compounds may be of the nitrogen, halogen, aryl and alkyl-aryl types. Typical substituted and unsubstituted acrylate and methacrylate compounds include: methyl acrylate, ethyl acrylate, 2-ethyl-hexyl acrylate, n-butyl acrylate, methyl alpha-chloracrylate, hydroxyethyl acrylate, dihydroperfluorobutyl acrylate, propylacrylate, isopropylacrylate, calcium acrylate, sodium acrylate, isobornyl acrylate, cyclohexyl acrylate, dodecyl acrylate, hexyldecyl acrylate, isopropyl acrylate, tetradecyl acrylate, ethylene glycol, sec butyl acrylate, dimethacrylate, methacrylate, 2-n-tert-butylaminoethyl methacrylate, 2-butyl methacrylate, glycidyl methacrylate, 2 chloroethyl methacrylate, 3,3 dimethylbutyl methacrylate, 2 ethylhexyl methacrylate, 2 methoxyethyl methacrylate, pentyl methacrylate, methyl methacrylate, ethyl methacrylate, n-butyl methacrylate, isobutyl methacrylate, sodium methacrylate, isopropyl methacrylate, propyl methacrylate and the like. Typical substituted styrene compounds include: alpha methyl, styrene, vinyl toluene, modified styrene, 4-bromostyrene, 4 chloro-3 fluorostyrene, 2 chlorostyrene, 2,5- dichlorostyrene, 2,5 difluorostyrene, 2,4 dimethyl styrene, 4 ethoxystyrene, 4 ethylstyrene, 4 hexyldecylstyrene, 3-hydroxymethylstyrene, 4-iodostyrene, 4-isopentoxystyrene, 4-nonadecylstyrene, and the like.

The polymerizable unsaturated monomers or prepolymers of this invention are mixed with any free-radical initiator or catalyst capable of polymerizing the monomers or prepolymers. By a "free-radical initiator or catalyst" is meant a compound which is capable of producing free-radicals under the polymerization conditions employed, such as compounds having an —O—O— or an —N=N— linkage. Examples of the more commonly employed free-radical initiators or catalysts include: alkyl peroxides such as tert-butyl, hydroperoxide, and di-tert-butyl peroxide; acyl and aroyl peroxides, such as debenzoyl peroxide, perbenzoic acid, dilauroyl peroxide, perlauric acid, and acetyl benzoyl peroxide; azo compounds, such as azo-bis-isobutyro nitrile, dimethylazo-diisobutrate, azo-bis-1-phenylethane and alkali metal azodisulfonates; and the like. In general, the free-radical initiators or catalysts are employed in an amount from about 0.001 to about 5.0 percent based on the combined weight of the polymerizable ingredients.

The polymerization temperature to be employed is generally dependent on the batch size, the amount of catalyst present, the molecular weight to be attained, and the activation energy of the polymerization reaction. The rate of polymerization increases with an increase in temperature. Because greater exothermic reactions occur at higher temperatures and increase the danger of uncontrollable reactions, high temperatures are preferably employed in processes where the heat of polymerization may be removed under controlled conditions, e.g., in stirred kettles or in jacketed tubes through which the polymerizable or partially polymerized material is continuously passed. The polymerization reaction is conducted at a temperature that is at or above the activation temperature of the particular free-radical catalyst employed but below the boiling points of the monomers present at the pressures used. Typical polymerization temperatures employed for batch type reactions at atmospheric pressure include a range from about 60° C. to about the reflux temperature of the monomer mixture. Reaction times ranging from about 6 to about 48 or more hours are usually employed at atmospheric pressure in batch type operations. However, economy and operating conditions such as the use of pressure or a vacuum may determine the use of higher or lower temperatures. Polymerization may be effectuated by suitable methods such as by bulk or solvent polymerization in batch, semi-continuous or continuous processes. If a solvent is employed, it may be any suitable true organic solvent, i.e., a liquid unreactive to the system but capable of dissolving the reactive components. Typical well known solvents include the chlorinated, ketone, ester and hydrocarbon solvents such as, for example, xylene, benzene, toluene, hexane, cyclopentane, 1,1,1-trichloroethylene, ethyl acetate, methyl ethyl ketone, dioxane, 1,1,2-trichloroethane. tetrachloroethane and the like.

The polymerization reaction may be terminated prior to complete polymerization where a partially polymerized mixture is desired. The degree of polymerization may be determined by periodic molecular weight tests of samples taken from the reaction mixture. When the weight - average molecular weight of the polymer is sufficient, as controlled by the reaction conditions including time, temperature, catalyst and type of monomers, the polymer or partially polymerized monomers may, if desired, be dissolved in any suitable solvent and stored for future use. The polymers of this invention are substantially linear and have a backbone of carbon-to-carbon linkages and contain silicon in side branches thereof. By the expression "substantially linear" is means a polymer which when a 5 gram sample is heated in 100 cc. of a refluxing solvent such as toluene, for about 30 minutes, the sample is substantially dissolved and void of gells. If a partially polymerized linear monomer mixture is to be used as a coating material, polymerization may be completed in situ on the surface of a substrate by further application of heat. To achieve further variation in the properties of the final resinous product, well known additives such as plasticizers, reactive or non-reactive resins, dyes, pigments, wetting agents and mixtures thereof may be mixed with the resin. Hydrolysis of the hydrolyzable groups attached to the silicon atoms may be promoted by pretreating a substrate with any suitable hydrolyzing medium, such as a dilute solution of acetic acid or sodium hydroxide, or by mixing the hydrolyzing material with the polymer prior to the coating operation.

The surprisingly better result obtained with the polymeric coating materials of this invention may be attributable to many factors. For example, the marked durability of the coating material may be due to the fact that these organosilicon polymers adhere extremely well to the substrates tested. Outstanding adhesion is obtained when the organosilicon compounds of this invention are applied to glass or similar siliceous surfaces. Coatings prepared from the organosilicon terpolymers of this invention possess smooth outer surfaces which are highly resistant to chipping and flaking. The resinous solid terpolymers may be used to form various coatings for metal, wood, fabrics, paper or the like. When these organosilicon compounds are employed in coatings for xerographic carriers, carrier life is unexpectedly extended, particularly with respect to toner impaction resistance. Additionally, the hydrophobic properties of the resins of this invention appear to contribute in some unknown manner to the stability of the triboelectric properties of the coated xerographic carriers.

The following examples further define, describe and compare methods of preparing the organosilicon terpolymers of the present invention and of utilizing them in coating applications. Parts and percentages are by weight unless otherwise indicated.

In the following, Examples I through XII are carried out by washing the acrylate or methacrylate monomers with a caustic solution to remove inhibitors and then washing with deionized water. These monomers and solvent, if any, are dried with anhydrous magnesium sulfate for 10 to 24 hours and then filtered. The unsaturated organosilicon compositions, unless otherwise indicated, are distilled at reduced pressures prior to polymerization.

Example I

A glass lined reaction vessel is charged with about 65 parts styrene, about 35 parts n-butyl methacrylate, about 5 parts vinyl triethoxy silane, and about 2.5 parts di-tert-butyl peroxide. The reaction vessel is then purged with dry argon gas introduced below the level of the reactants. The reaction mixture is then heated at about 93° C. and at atmospheric pressure, with agitation, for about 48 hours. The resulting styrene/n-butyl methacrylate/vinyl triethoxy silane terpolymer is then cooled and removed from the reaction vessel. The weight-average molecular weight of the terpolymer, as determined by light scattering techniques, is about 800,000. Approximately 10 parts of the terpolymer is dissolved in 90 parts toluene and applied to a glass slide. After drying, the resulting hard glossy coating cannot be removed by pressing and then stripping Scotch Cellophane Brand Tape from the surface of the coating.

Example II

A glass lined reaction vessel is charged with about 15 parts styrene, about 85 parts methyl methacrylate, about 5 parts vinyl triethoxy silane, and about 2.5 parts di-tert-butyl peroxide. The vessel is then purged with dry argon gas introduced below the level of the reactants. The reaction mixture is then heated at about 93° C. and at atmospheric pressure, with agitation, for 48 hours. The resulting styrene/methyl methacrylate/vinyltriethoxy silane terpolmer is then cooled and removed from the reaction vessel. The weight-average molecular weight of the terpolymer, as determined by light scattering techniques, is about 370,000. About a 10 percent solution of the terpolymer dissolved in toluene is applied to 600 micron glass beads. After drying, the glass beads are tumbled in a rotating cylindrical glass jar having a diameter of 2½ inches and a surface speed of 140 feet per minute for 240 hours. Examination of the tumbled beads reveal no coating chips or flakes.

Example III

A ceramic reaction vessel is charged with about 15 parts styrene, about 85 parts methyl methacrylate, about 5 parts partially polymerized vinyl triethoxy silane and about 2.5 parts di-tert-butyl peroxide. The vessel is then purged with dry nitrogen gas introduced below the level of the reactants. The reaction mixture is then heated to about 90° C. and at atmospheric pressure, with stirring, for about 24 hours. The resulting styrene/methyl methacrylate/vinyl triethoxy silane terpolymer is then cooled and removed from the reaction vessel. The weight-average molecular weight of the terpolymer, as determined by light scattering techniques, is about 350,000. About a 25 percent solution of the terpolymer dissolved in toluene is applied as a thin coating around the outer surface of a Pyrex test tube. Test tube integrity is maintained even when the glass is broken by sharply rapping the coated test tube against a hard table surface.

Example IV

A stirrer-equipped pressurized vessel is charged with about 15 parts styrene, about 85 parts methyl methacrylate, about 5 parts vinyl triethoxy silane and about 2 parts di-tert-butyl peroxide. The pressurized vessel is purged with dry argon gas introduced below the level of the reactants. The reaction mixture is then heated to about 120° C., with stirring, for about 24 hours. The resulting styrene/methyl methacrylate/vinyl triethoxy silane terpolymer is then cooled and removed from the reactor vessel. The weight-average molecular weight of the terpolymer, as determined by light scattering techniques, is about 200,000. The terpolymer is applied as a thin coating to a thin steel sheet. No peeling or flaking is observed when the coated steel sheet is folded in half.

Example V

A stainless steel reaction vessel is charged with about 65 parts styrene, about 35 parts n-butyl methacrylate, about 5 parts undistilled vinyl triethoxy silane and about 2.5 parts di-tert-butyl peroxide. The vessel is then purged with dry nitrogen gas introduced below the level of the reactants. The reaction mixture is then heated to about 93° C. and at atmospheric pressure with stirring, for about 48 hours. The resulting styrene/n-butyl methacrylate/vinyl triethoxy silane terpolymer is then cooled and removed from the reaction vessel. The weight-average molecular weight of the terpolymer, as determined by light scattering techniques, is about 800,000. Molten droplets of this terpolymer are pressed between two clean glass slides. The glass slides cannot be separated without breaking after the terpolymer is allowed to solidify.

Example VI

A glass lined reaction vessel is charged with about 65 parts styrene, about 35 parts n-butyl methacrylate, about 5 parts gamma-methacryloxypropyltrimethoxy silane and about 0.5 part azobisisobutyronitrile. The vessel is then purged with dry nitrogen gas introduced below the level of the reactants. The reaction mixture is then heated to about 80° C. and at atmospheric pressure, with stirring, for about 24 hours. The resulting styrene/n-butyl methacrylate/gamma-methacryloxypropyltrimethoxy silane terpolymer is then cooled and removed from the reaction vessel. The weight-average molecular weight of the terpolymer, as determined by light scattering techniques, is about 800,000. Approximately 10 parts terpolymer is dissolved in about 90 parts dioxane and applied to a glass slide. After drying, the coating cannot be removed by the tape test described in Example I.

Example VII

A glass lined reaction vessel is charged with about 65 parts styrene, about 35 parts isobutyl methacrylate, about 5 parts gamma-methacryloxypropyltrimethoxy silane and about 1.0 part azobisisobutyro nitrile. The vessel is then purged with dry nitrogen gas introduced from below the level of the reactants. The reaction mixture is then heated to about 85° C. and at atmospheric pressure, with stirring, for about 24 hours. The resulting styrene/isobutyl methacrylate/gamma - methacryloxypropyltrimethoxy silane terpolymer is then cooled and removed from the reaction vessel. The weight-average molecular weight of the terpolymer, as determined by light scattering techniques, is about 100,000. Coatings of this terpolymer on copper wires have good electrical properties and good flexibility.

Example VIII

A stainless steel reaction vessel is charged with about 65 parts styrene, about 35 parts ethyl methacrylate, about 5 parts gamma-methacryloxypropyltrimethoxy silane and about 0.5 part azobisisobutyro nitrile. The vessel is then purged with dry argon gas introduced below the level of the reactants. The reaction mixture is then heated to about 80° C. and at atmospheric pressure, with stirring, for about 24 hours. The resulting styrene/ethyl methacrylate/gamma-methacryloxypropyltrimethoxy silane terpolymer is then cooled and removed from the reaction vessel. The weight-average molecular weight of the terpolymer, as determined by light scattering techniques, is about 250,000. Approximately 10 parts of this terpolymer is dissolved in about 90 parts toluene and applied to a glass slide. After drying, the resulting coating cannot be removed by the tape test described in Example I.

Example IX

A glass lined reaction vessel is charged with about 85 parts styrene, 15 about parts ethyl acrylate, 5 about parts vinyl triethoxy silane and about 2.5 parts di-tert-butyl peroxide. The vessel is then sealed and purged with dry nitrogen gas introduced below the level of the reactants. The reaction mixture is then purged with dry argon gas introduced below the level of the reactants. The reaction mixture is then heated to about 90° C. and at atmospheric pressure, with agitation, for about 48 hours. The resulting styrene/ethyl acrylate/vinyl triethoxy silane terpolymer is then cooled and removed from the reaction vessel. The weight-average molecular weight of the terpolymer, as determined by light scattering techniques is about 350,000. Approximately 20 parts terpolymer is dissolved in about 90 parts diethyl ketone and applied to a glass slide. After drying, the resulting glossy coating cannot be removed by the tape test described in Example I.

Example X

A stainless steel reaction vessel is charged with about 15 parts styrene, about 85 parts isobornyl acrylate, 5 parts methacryloxypropyltrimethoxy silane, and about .5 part azobisisobutyronitrile. The vessel is then purged with dry argon gas introduced below the level of the reactants. The reaction mixture is then heated to about 80° C. and at atmospheric pressure, with agitation, for about 24 hours. The resulting styrene/isobornyl acrylate/methacryloxypropyltrimethoxy silane terpolymer is then cooled and removed from the reaction vessel. The weight-average molecular weight of the terpolymer, as determined by light scattering techniques, is about 400,000. Molten droplets of this terpolymer are pressed between two clean glass slides. The glass slides cannot be separated without breaking after the terpolymer is allowed to solidify.

Example XI

A glass lined reaction vessel is charged with about 15 parts styrene, about 85 parts methyl methacrylate, about 5 parts vinyl triethoxy silane, about 2.5 parts di-tert-butyl peroxide, and about 50 parts toluene. The vessel is then purged with dry argon gas introduced below the level of the reactants. The reaction mixture is then heated to about 90° C. and at atmospheric pressure, with stirring for about 40 hours. The resulting styrene/methyl methacrylate/vinyl triethoxy silane terpolymer is then cooled and removed from the reaction vessel. The weight-average molecular weight of the terpolymer, as determined by light scattering techniques, is about 310,000. Approximately 10 parts of this terpolymer is dissolved in about 90 parts toluene and applied to a glass slide. After drying, the resulting glossy coating could not be removed by the tape test described in Example I.

Example XII

A glass lined reaction vessel is charged with about 15 parts styrene, about 85 parts methyl methacrylate, about 5 parts vinyl triethoxy silane, about 2.5 parts di-tert-butyl peroxide and about 38 parts toluene. The vessel is then purged with dry argon gas introduced below the level of the reactants. The reaction mixture is then heated to about 90° C. and at atmospheric pressure, with stirring, for about 48 hours. The resulting styrene/methyl methacrylate/vinyl triethoxy silane terpolymer is then cooled and removed from the reaction vessel. The weight-average molecular weight of the terpolymer, as determined by light scattering techniques, is about 601,000. Approximately 10 parts of this terpolymer is dissolved in about 90 parts dioxane and applied to a glass slide. After drying, the resulting coating cannot be removed by the tape test described in Example I.

Example XIII

A glass lined reaction vessel is charged with about 15 parts styrene, about 85 parts methyl methacrylate, about 2.5 parts vinyl triethoxy silane, and about 2.5 parts di-tert-butyl peroxide. The vessel is then purged with dry argon gas introduced below the level of the reactants. The reaction mixture is then heated to about 93° C. and at atmospheric pressure, with stirring, for about 48 hours. The resulting styrene/methyl methacrylate/vinyl triethoxy silane terpolymer is then cooled and removed from the reaction vessel. The weight-average molecular weight of a terpolymer as determined by light scattering techniques is about 450,000. Approximately 10 parts of this terpolymer is dissolved in about 90 parts toluene and applied to a glass slide. After drying, the resulting coating cannot be removed by the tape test described in Example I.

Example XIV

A glass lined reaction vessel is charged with about 65 parts styrene, about 35 parts methyl methacrylate, about 10 parts gamma-methacryloxypropyltrimethoxysilane, and about 0.5 part azobisisobutyro nitrile. The vessel is then purged with dry nitrogen gas introduced below the level of the reactants. The reaction mixture is then heated to about 80° C. and at atmospheric pressure, with agitation, for about 24 hours. The resulting styrene/methyl methacrylate/gamma-methacryloxypropyltrimethoxysilane terpolymer is then cooled and removed from the reaction vessel. The weight-average molecular weight of the terpolymer, as determined by light scattering techniques, is about 600,000. Approximately 10 parts of this terpolymer is dissolved in about 90 parts toluene and applied to a glass slide. After drying, the resulting coating cannot be removed by the tape test described in Example I.

Although specific materials and conditions were set forth in the above exemplary processes in making and using the compounds of this invention, these are merely intended as illustrations of the present invention. Various other substituents and processes such as those listed above may be substituted for those in the examples with similar results.

Other modifications of the present invention will occur to those skilled in the art upon a reading of the present disclosure. These are intended to be included within the scope of this invention.

What is claimed is:

1. A substantially linear addition terpolymer of (1) from about 0.5 to about 99 percent, by weight of a polymerizable styrene composition, (2) from about 99 to about 0.5 percent, by weight, of a polymerizable composition selected from the group consisting of acrylate and methacrylate esters and (3) from about 0.5 to about 50 percent, by weight, of a polymerizable organo silicon composition selected from the group consisting of organo silanes, silanols and siloxanes having from 1 to 3 hydrolyzable groups and an organic group attached directly to a silicon atom containing an unsaturated carbon to carbon linkage.

2. A solid substantially linear addition terpolymer of (1) from about 5 to about 94.5 percent, by weight, of a polymerizable styrene composition, (2) from about 94.5 to about 5 percent, by weight, of a methacrylate composition selected from the group consisting methyl, ethyl, propyl and butyl methacrylates and (3) from about 0.5 to about 50 percent, by weight, of a polymerizable organo silicon composition selected from the group consisting of silanes, silanols and siloxanes having from 1 to 3 hydrolyzable groups and an organic group attached directly to a silicon atom containing unsaturated carbon to carbon linkage.

3. A Solid substantially linear addition terpolymer according to claim 2 wherein said organo silicon compound is vinyl triethoxy silane.

4. A solid substantially linear addition terpolymer according to claim 2 wherein said organo silicon composition is gamma-methacryloxypropyltrimethoxy silane.

5. The process of polymerizing to a solid substantially linear high molecular weight composition a mixture of ingredients comprising (1) from about 0.5 to about 99 percent, by weight of a polymerizable styrene composition, (2) from about 99 to about 0.5 percent, by weight, of an ester selected from the group consisting of polymerizable acrylate and methacrylate esters and (3) from about 0.5 to about 50 percent by weight, of a polymerizable organo silicon composition selected from the group consisting of silanes, silanols and siloxanes having from 1 to 3 hydrolyzable groups and an organic group attached directly to a silicon atom containing an unsaturated carbon to carbon linkage, which process comprises heating the aforesaid mixture of ingredients under anhydrous conditions in the presence of a free radical initiator.

6. A process according to claim 5 wherein said process is conducted in the presence of a true solvent for said mixture of ingredients.

7. A process for polymerizing to a solid substantially linear high molecular weight composition a mixture of ingredients comprising (1) from about 5 to about 94.5 percent, by weight, of a polymerizable styrene composition, (2) from about 94.5 to about 5 percent, by weight, of a methacrylate ester selected from the group consisting of methyl, ethyl, propyl, and butyl methacrylates and (3) from about 0.5 to about 50 percent, by weight, of a polymerizable organo silicon composition from the group consisting of silanes, silanols, and siloxanes having from 1 to 3 hydrolyzable groups and an organic group attached directly to a silicon atom containing an unsaturated carbon to carbon linkage, which process comprises heating the aforesaid mixture of ingredients with about 0.001 to about 5.0 percent, based on the weight of said aforesaid mixture, of a free radical initiator under anhydrous conditions to a temperature between about the activation temperature of said initiator and the boiling point of all the ingredients of said aforesaid mixture.

8. The process according to claim 7 wherein said process is conducted in the presence of a true solvent for said mixture of ingredients.

9. A substantially linear addition terpolymer of (1) from about 5 to about 94.5 percent by weight, of styrene, (2) from about 94.5 to about 5 percent, by weight, of a methacrylate composition selected from the group consisting of methyl, ethyl, propyl, butyl methacrylates and (3) from about 0.5 to about 50 percent, by weight, of an organo silicon compound selected from the group consisting of vinyl triethoxy silane and gamma-methacryloxypropyltrimethoxy silane.

References Cited

UNITED STATES PATENTS

| | | | |
|---|---|---|---|
| 2,532,583 | 12/1950 | Tyran | 260—80 |
| 2,982,757 | 5/1961 | Lewis | 260—46.5 |
| 2,983,719 | 5/1961 | Cox et al. | 260—86.1 |
| 3,080,348 | 3/1963 | Lang et al. | 260—86.7 |

JOSEPH L. SCHOFER, Primary Examiner

STANFORD M. LEVIN, Assistant Examiner

U.S. Cl. X.R.

117—124, 128, 132, 139.5, 148, 155; 161—203; 260—32.8, 33.2, 33.6